(12) United States Patent
Ng et al.

(10) Patent No.: US 6,745,387 B1
(45) Date of Patent: Jun. 1, 2004

(54) METHOD FOR USING A TRANSACTION SERVICE SYNCHRONIZATION INTERFACE TO PERFORM INTERNAL STATE CLEAN UP

(75) Inventors: Tony Chun Tung Ng, Fremont, CA (US); Albert Christudas Gondi, Santa Clara, CA (US); Thulasiraman Jeyaraman, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/333,138

(22) Filed: Jun. 14, 1999

(51) Int. Cl.$^7$ .................................................. G06F 9/00
(52) U.S. Cl. ....................................................... 718/101
(58) Field of Search .......................... 709/101; 707/103, 707/206; 718/101

(56) References Cited

U.S. PATENT DOCUMENTS

| | | | | |
|---|---|---|---|---|
| 6,026,428 A | * | 2/2000 | Hutchison et al. | 709/108 |
| 6,101,527 A | * | 8/2000 | Lejeune et al. | 709/201 |
| 6,115,715 A | * | 9/2000 | Traversat et al. | 707/100 |
| 6,418,447 B1 | * | 7/2002 | Frey et al. | 707/103 R |

OTHER PUBLICATIONS

Cheung et al., "Java Transaction API (JTA)", Version 1.0.1, Sun Microsystems, Inc., Apr. 29, 1999, pp. 1–21.*
"Use of XA–Compliant Resource to Interoperate with Object Transaction Service," Mar. 1, 1995, IBM Technical Disclosure Bulletin, vol. 38, issue 3, pp. 617–620.*
Cheung et al., "Java Transaction API (JTA)", Version 1.0.1, Sun Microsystems, Inc., Apr. 29, 1999.*
"Transction Service Specification (Chapter 10)", Object Management Group's CORBA Services Standard, Version 1.1, Nov. 1997.
Susan Cheung, "Java Transaction Service (JTS)", Version 0.95, Sun Microsystems, Inc., Mar. 1, 1999.

* cited by examiner

Primary Examiner—Meng-Al T. An
Assistant Examiner—Li B. Zhen
(74) Attorney, Agent, or Firm—Beyer Weaver & Thomas, LLP

(57) ABSTRACT

A method for using a Synchronization Interface in a computer system compliant with a CORBA Object Transaction Service or a Java Transaction API (such as Java 2 Platform Enterprise Edition Reference Implementation) to perform internal state clean up in containers associated with a completed transaction. First, a synchronization object is registered for each new transaction in a container with a Transaction Manager. The Transaction Manager detects a completion of the transaction and then invokes an "after_completion" operation (method) on the synchronization object. This notifies each container involved in the completed transaction to perform internal memory space clean up. Thus, the method uses an existing Synchronization Interface mechanism to perform internal memory state clean up in containers, without adding additional communication mechanisms.

15 Claims, 3 Drawing Sheets

```
interface Synchronization : TransactionalObject (
    void before_completion();
    void after_completion(in Status status);
):
```

*FIG. 1*

(PRIOR ART)

METHOD FOR USING A TRANSACTION SERVICE SYNCHRONIZATION INTERFACE TO PERFORM INTERNAL STATE CLEAN UP

BACKGROUND OF THE INVENTION

1. Field of the Invention

The present invention relates generally to transaction management in a distributed object computing environment, and more particularly, to a method for using a transaction service synchronization interface to perform container internal state clean-up after a transaction has completed.

2. Description of the Related Art

The Common Object Request Broker Architecture (CORBA), an industry standard established by the Object Management Group (OMG), is designed to provide object-oriented, distributed computing standardization and interoperability. One aspect of the CORBA standard relates to transaction management, which ensures that transactions are properly handled across an object-oriented distributed system. Specifically, the Object Transaction Service (OTS) Specification, version 1.1, November 1997, herein incorporated by reference, specifies the transaction services requirements. In a CORBA compliant system, a transaction is viewed as a unit of work having the following characteristics:

A transaction is atomic; if interrupted by failure, all effects are undone (rolled back).

A transaction produces consistent results; the effects of a transaction preserve invariant properties.

A transaction is isolated; its intermediate states are not visible to other transactions. Transactions appear to execute serially, even if they are performed concurrently.

A transaction is durable; the effects of a completed transaction are persistent; they are never lost (except in a catastrophic failure).

The OTS 1.1 Specification defines interfaces that allow multiple, distributed objects to cooperate. In particular, each transaction is "atomic"—that is, each transaction is either completed (all changes committed) or the changes are rolled back. The defined interfaces enable objects to either commit all the changes or perform a rollback. One interface defined by the specification is the Synchronization Interface. The Synchronization Interface allows different system resources participating in transaction to be notified that transaction is about to complete (or "commit"), and therefore the resources can flush out any transient data to a database (i.e. store the data).

An object with transient state data is notified by the Transaction Service through the Synchronization Interface prior to the completion of a transaction, in order to flush any transient data to storage (i.e. the transient data is made "persistent"). This notification is performed by a "before_completion" operation. After the transaction has completed, the Transaction Service invokes an "after_completion" operation. An example of the syntax for these operations is shown in FIG. 1.

One problem posed by distributed transaction processing is that each portion of a distributed transaction may not be aware of when the transaction actually completes. As a result, temporary memory space used for the transaction may not be cleaned up after the transaction processing has completed. Therefore, it would be desirable to have a mechanism to notify individual objects that a particular transaction has completed and that any associated memory space may be cleaned (i.e. reallocated for use).

SUMMARY OF THE INVENTION

The present invention is a method for using a Synchronization Interface in a computer system compliant with a CORBA Object Transaction Service or the Java Transaction API (such as Java 2 Platform Enterprise Edition Reference Implementation) to perform internal state clean up in containers associated with a completed transaction. First, a synchronization object is registered for each new transaction in a container with a Transaction Manager compliant with either OTS or JTA. The Transaction Manager detects a completion of the transaction and then invokes an "after_completion" operation (method) on the synchronization object. This notifies each container involved in the completed transaction to perform internal memory space clean up.

Thus, the method uses an existing Synchronization Interface mechanism (originally designed to flush transient data to storage) to perform internal memory state clean up in containers. Since the Transaction Manager does not need to have specific knowledge of the container, no modifications are needed to the Transaction Manager. Also, since the Transaction Managers already cooperate among themselves, there is no need to create a whole new communication mechanism, which would add complexity and inefficiency.

BRIEF DESCRIPTION OF THE DRAWINGS

The present invention will be readily understood by the following detailed description in conjunction with the accompanying drawings, wherein like reference numerals designate like structural elements, and in which:

FIG. 1 illustrates the syntax of a CORBA-compliant Synchronization Interface;

DETAILED DESCRIPTION OF THE INVENTION

The following description is provided to enable any person skilled in the art to make and use the invention and sets forth the best modes contemplated by the inventor for carrying out the invention. Various modifications, however, will remain readily apparent to those skilled in the art, since the basic principles of the present invention have been defined herein specifically to provide a method for using a transaction service synchronization interface to perform internal state clean up.

Sun Microsystem's Java 2 Platform Enterprise Edition (J2EE) is a platform for constructing Java technology based multi-tier applications across a distributed, object-oriented enterprise. One specific J2EE-compliant implementation is known as the J2EE Reference Implementation or J2EE RI. The J2EE RI includes an implementation of a Java Transaction Service (JTS) and a Java Transaction API (JTA). The JTS is specified by the Java Transaction Service draft specification, version 0.95, Mar. 1, 1999, and the JTA is specified by the Java Transaction API specification, version 1.0.1, Apr. 29, 1999, both specifications herein incorporated by reference. The JTA specification specifies the high-level interfaces between a Transaction Manager and any other parties involved in a distributed transaction system, such as the application, the resource manager, and the application server. The JTS specification specifies the Transaction Manager, which supports the JTA specification at the high-level and implements the OTS 1.1 Specification at the low-level. The present invention can be implemented using a Transaction Manager compliant with either OTS or JTA, or both OTS and JTA.

Figure 2:
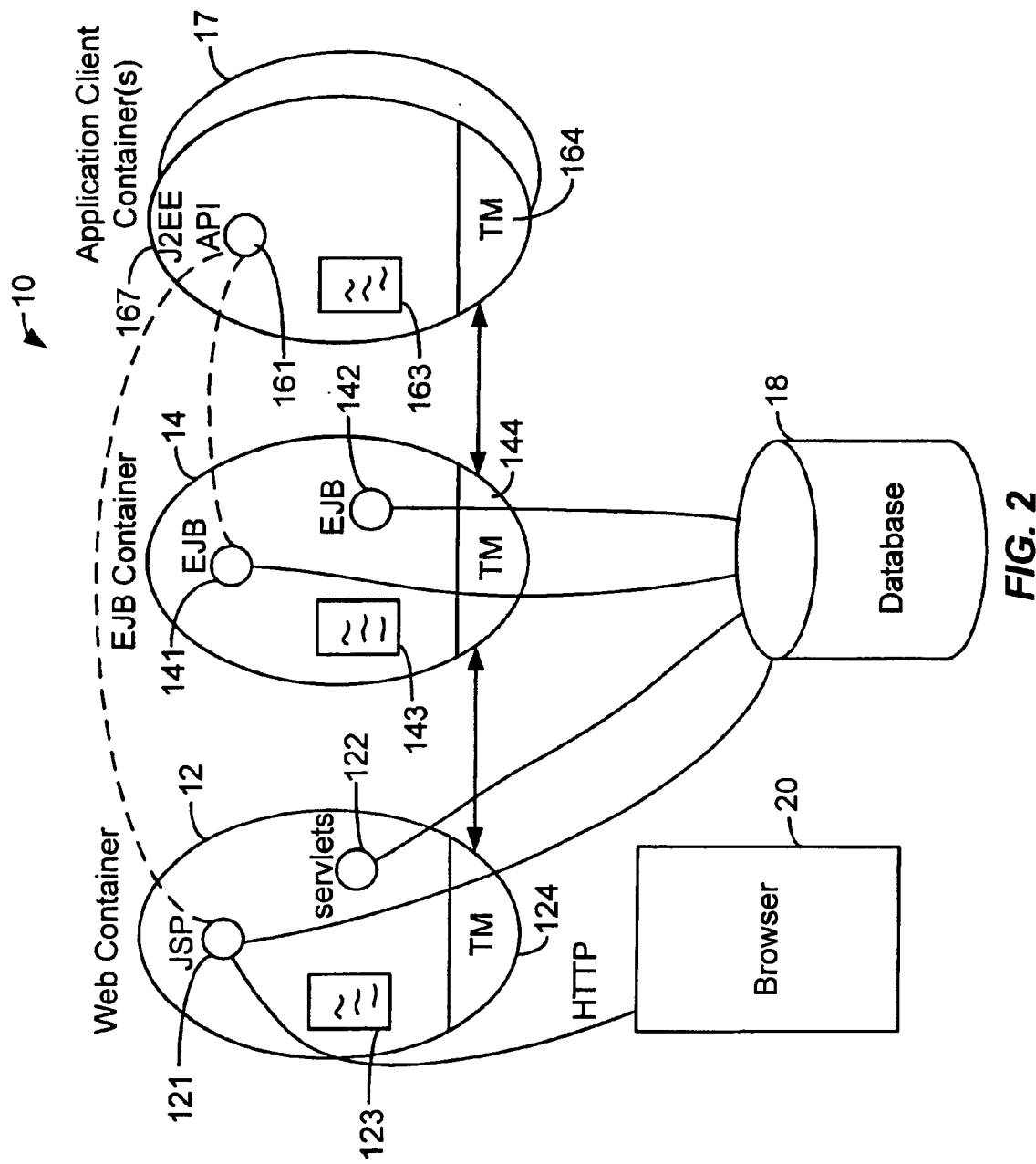
FIG. 2 is a diagram of a typical J2EE reference implementation.

A typical J2EE implementation 10 is illustrated in FIG. 2. The J2EE implementation 10 may be installed on one or more physical machines, as the J2EE standard does not specify any predefined hardware configuration. The standard architecture supports two types of components, Web components and Enterprise Java Bean (EJB) 141, 142 components, and also application clients. The Web components include Java Server Pages (JSP) 121 and servlets 122. The JSP components 121 may be accessed, for example, by a web browser 20 using HTTP. Each type of component is contained within a "Container" 12, 14, 16, 17 which provides an environment within which components or applications run. A J2EE implementation 10 may contain multiples of the same type of containers 16, 17 and the containers may exist in a distributed environment. Individual components can interact with each other across containers or with external databases 18. Each container has its own Transaction Manager 124, 144, 164 to manage transactions within the container. The Transaction Managers can communicate with other Transaction Managers to determine transaction status information.

J2EE RI provides a distributed application server environment and keeps track of various states for each component in each transaction. In general, only the Transaction Managers 124, 144, 164, however, know when a transaction has completed. For example, the J2EE RI might get involved in a transaction that is started by a client on a remote machine, but only the remote client and the Transaction Managers 124, 144, 164 know when the a transaction has completed. This creates a system maintenance problem for a J2EE RI environment. Specifically, without knowing when a transaction has completed, the J2EE RI does not know when to perform transient state clean up within each container 12, 14, 16, 17. Each container 12, 14, 16, 17 has memory space 123, 143, 163 used to store internal state information for each transaction. If the memory space 123, 143, 163 is not freed after a transaction has completed, the amount of space available for other transactions is reduced (causing "memory leaks"). Over time, these memory leaks may reduce system performance or even cause the system to crash. One possible solution is to modify the Transaction Manager implementation to perform the state clean up, but this would result in an undesirable coupling between the Transaction Manager and the J2EE RI. Also, any changes to the Transaction Manager interface may make it non-compliant with OTS 1.1. Thus, it would be desirable to implement an internal state clean up mechanism for each container after a transaction has completed, without modifying the current Transaction Manager implementation.

As described above, the J2EE system 10 needs to clean up the internal states in each container 12, 14, 16, 17 after a transaction completes, so that the allocated memory 123, 143, 163 is not used up. However, since one transaction may span multiple machines and processes, it is difficult for all the containers to know when to perform a clean up operation. The present invention uses the Synchronization Interface of a Transaction Manager that supports OTS or JTA in a unique way to trigger each container involved in a transaction to perform a clean up operation. The present mechanism has not previously been proposed or recommended, but may be implemented without adversely affecting the Synchronization Interface operation.

Figure 3:
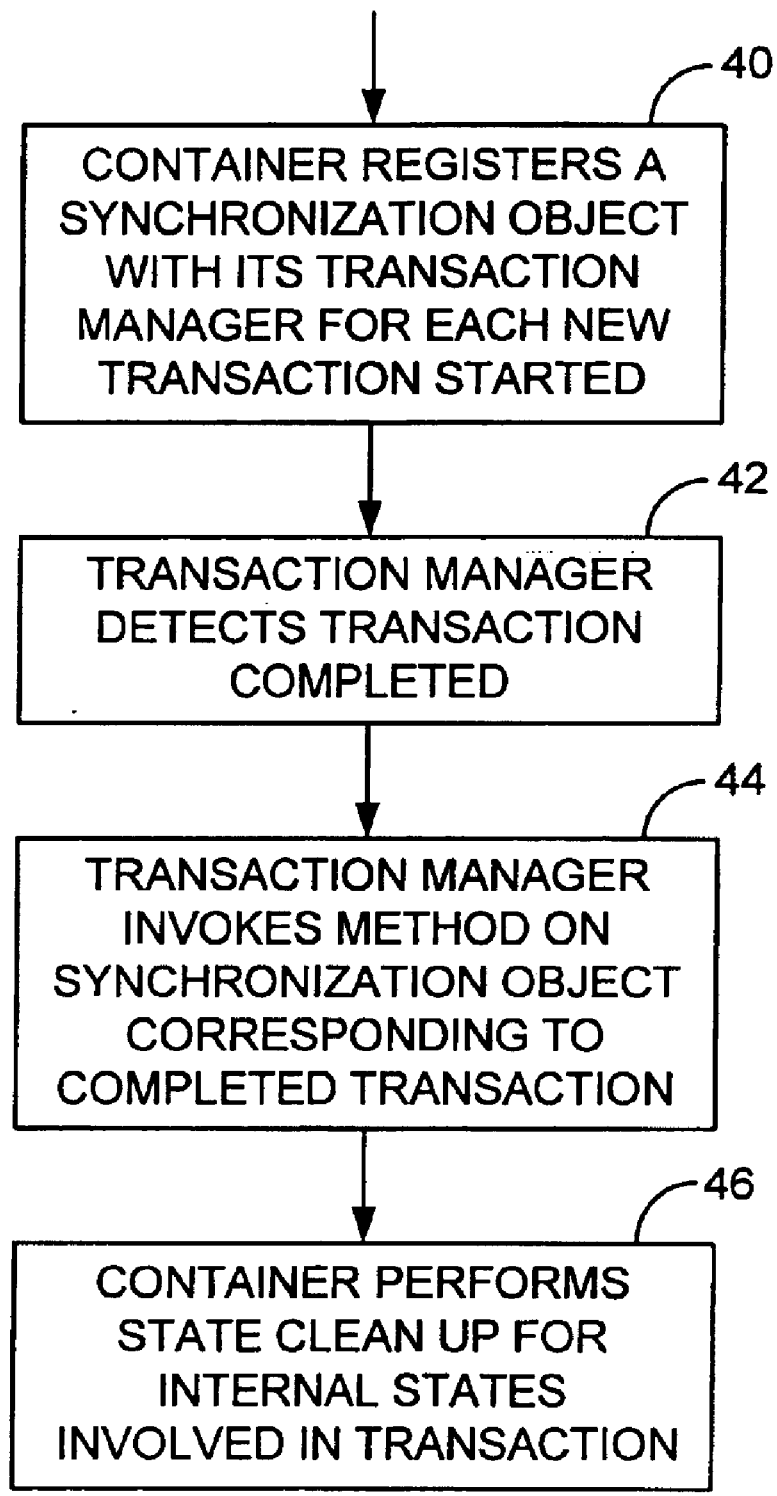
FIG. 3 is a flowchart of the procedure of the present invention.

The procedure of the present invention is illustrated in FIG. 3. According to the present invention, the J2EE RI registers a Synchronization object with the Transaction Manager for each transaction that is started, or when the J2EE RI first learns it is involved with a transaction (step 40). When a transaction completes (step 42), the Transaction Manager invokes a method (operation) on the Synchronization object (step 44). Upon the invocation of this method, the J2EE RI performs the necessary container state clean up for this transaction (step 46). Each Transaction Manager knows when a transaction is being completed, since it is in communication with all other Transaction Managers. Thus, via a Synchronization object, distributed state clean up in the containers can be performed, without adding additional code or complexity.

In further detail, when a container creates a system state particular to a transaction, the container attempts to register a Synchronization object with its own Transaction Manager. Since each container may have many states for a single transaction, only one Synchronization object is registered per transaction. It is not necessary, or efficient, to keep registering new Synchronization object for the same transaction. A separate data structure may be used to mark that a particular transaction has already been registered, in order to avoid registering multiple objects for the same transaction.

In a standard CORBA Synchronization Interface, two operations are defined:

before_completion

This operation is invoked prior to the start of the two-phase commit protocol and ensures that any state data that must be made persistent (i.e. saved) is made available to the necessary resource.

after_completion

This operation is invoked after all the commit or rollback responses have been received, and the current status of the transaction is provided as input.

A similar method is defined by the JTA specification, and its operation is similar to that defined by the CORBA standard.

In the present invention, the before_completion method is called right before a transaction is completed, but basically does not perform any function for the present mechanism. However, an application developer may decide to use this function to perform some preliminary clean up tasks, if relevant. The after_completion method is called immediately after a transaction has completed. The after_completion method triggers a clean up operation in each container affiliated with the transaction. FIG. 1 illustrates the syntax of these operations. The object which implements the Synchronization Interface will provide the before_completion and after_completion methods. For the after_completion method, the body of the method should contain code to perform the necessary clean up operation. Since the clean up operation to be performed is unique to each container, a unique routine needs to run in each container to actually perform the clean up. Actual methods to perform the clean up are well known to those skilled in the art, the disclosure of which is beyond the scope of the present invention.

As used herein, the term "method" is well known to those of skill in the art to define a particular computer software construct. So as not to confuse this software term with the normally understood claim term "method," in the appended claim language the software term "method" is referred to as an "operation."

Thus, using a predefined mechanism of the Transaction Manager in a new way, a clean up operation can be performed across multiple containers without requiring additional complexity or overhead. Since the Transaction Manager does not need to have specific knowledge of the container, no modifications are needed to the Transaction Manager. Also, since the Transaction Managers already cooperate among themselves, there is no need to create a whole new communication mechanism, which would add complexity and inefficiency.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A method for performing internal state clean up in a container-based distributed computer-system after a distributed transaction has completed, the distributed transaction being distributed between a plurality of computing nodes of the computer system that each process a portion of the distributed transaction, container-based distributed computer system including a plurality of containers each being capable of running two or more components therein and each of the plurality of containers having their own internal memory, the method comprising the steps of:

providing a transaction manager for each of the plurality of computing nodes;

providing a synchronization object for each of the transaction managers;

registering, by each of the plurality of computing nodes that is involved in a distributed transaction, a synchronization object with its associated transaction manager, for the distributed transaction, wherein the distributed transaction is distributed for processing between a first and a second container respectively associated with a first and a second transaction manager that respectively manage the transactions associated with the first and the second container;

detecting by each of the associated transaction managers, a completion of the distributed transaction, wherein the detection is achieved by inter-communication between the associated transaction managers;

invoking, by each of the associated transaction managers, an operation (method) on each of the synchronization objects registered by each of the plurality of computing nodes on behalf of the first and second containers, for the completed distributed transaction when the completion of the distributed transaction is detected by each of the associated transaction mangers; and performing internal state clean up, by each of the plurality of computing nodes that is involved in a distributed transaction, in response to the invoked operation, wherein the internal state clean up operates to clean-up memory that is used to perform the distributed transaction associated with the first and second container of the computing system.

2. The method of claim 1, wherein a new synchronization object is registered once for each new transaction.

3. The method of claim 1, wherein the computer system is either a CORBA Object Transaction Service (OTS) or a Java Transaction API (JTA) compliant system.

4. The method of claim 3, wherein the computer system is a Java 2 Platform Enterprise Edition (J2EE) compliant system.

5. The method of claim 4, wherein an "after_completion" operation is used to invoke the operation immediately following the completion of the transaction.

6. The method of claim 5, wherein the internal state clean up is performed for each container involved in the completed transaction.

7. In a container-based distributed computer system including a plurality of containers each being capable of running two or more components therein and each of the plurality of containers having their own internal memory, a method for using a Synchronization Interface to perform internal state clean up in the container-based distributed computer system after a distributed transaction has completed, the distributed transaction being distributed between a plurality of computing nodes of the container-based distributed computer system that each process a portion of the distributed transaction, the method comprising the steps of:

registering a synchronization object for each new distributed transaction that is distributed for processing between a first and a second container respectively associated with a first and a second Transaction Manager that respectively manage the transactions associated with the first and the second container, and wherein the registering of the synchronization object is performed by the first and second containers with the first and the second Transaction manager;

detecting a completion of a transaction via inter-communications between the first and second Transaction Managers operating in the distributed computer system;

invoking, by each one of the first and the second transaction managers, an "after_completion" operation (method) on the registered synchronization objects for the first and second containers when the detecting determines that a completion of the distributed transaction has been detected; and performing internal memory space clean up, by the first and second containers of the computer system in response to the "after_completion" operation, wherein the internal state clean up operates to clean up memory that is used to perform the distributed transaction in each of the first and second containers.

8. A computer readable medium including computer program code for using a Synchronization Interface to perform internal state clean up in a container-based distributed computer system after a distributed transaction has completed, the distributed transaction being distributed between a plurality of computing nodes of the container-based distributed computer system that each process a portion of the distributed transaction, wherein the container-based distributed computer system includes a plurality of containers that are each capable of running two or more components therein and each of the plurality of containers have their own internal memory, the computer readable medium comprising:

computer program code for registering a synchronization object for each new distributed transaction that is distributed for processing between a first and a second container respectively associated with a first and a second Transaction Manager that respectively manage the transactions associated with the first and the second container, and wherein the registering of the synchronization object is performed by the first and second containers with the first and the second Transaction manager;

computer program code for detecting a completion of a transaction via inter-communications between the first and second Transaction Managers operating in the distributed computer system;

computer program code for invoking, by each one of the first and the second transaction managers, an "after_completion" operation (method) on the registered synchronization objects for the first and second containers when the detecting determines that a completion of the distributed transaction has been detected; and computer program code for performing internal memory space clean up, by the first and second containers of the computer system in response to the "after_completion" operation, wherein the internal state clean up operates to clean up memory that is used to perform the distributed transaction in each of the first and second containers.

9. A computer readable medium as recited in claim 8, wherein the computer system is either a CORBA Object Transaction Service (OTS) or a Java Transaction API (JTA) compliant system.

10. A computer readable medium as recited in claim 8, wherein the computer system is a Java 2 Platform Enterprise Edition (J2EE) compliant system.

11. A computer readable medium as recited in claim 8, wherein an "after_completion" operation is used to invoke the operation immediately following the completion of the transaction.

12. A container-based distributed computer system for processing a distributed transaction that is distributed between a plurality of computing nodes of the container-based distributed computer system that each process a portion of the distributed transaction, wherein the container-based distributed computer system includes a plurality of containers that are each capable of running two or more components therein and each of the plurality of containers have their own internal memory, the container-based distributed computer system comprising:

at least one central processing unit for each of the a plurality of computing nodes;

internal memory for each of the plurality of containers;

computer program code operating on each of the plurality of computing nodes that when executed is capable of:

registering a synchronization object for each new distributed transaction that is distributed for processing between a first and a second container respectively associated with a first and a second Transaction Manager that respectively manage the transactions associated with the first and the second container, and wherein the registering of the synchronization object is performed by the first and second containers with the first and the second Transaction manager;

detecting a completion of a transaction via inter-communications between the first and second Transaction Managers operating in the distributed computer system;

invoking, by each one of the first and the second transaction managers, an "after_completion" operation (method) on the registered synchronization objects for the first and second containers when the detecting determines that a completion of the distributed transaction has been detected; and performing internal memory space clean up, by the first and second containers of the computer system in response to the "after_completion" operation, wherein the internal state clean up operates to clean up memory that is used to perform the distributed transaction in each of the first and second containers.

13. A container-based distributed computer system as recited in claim 12, wherein the container-based distributed computer system is either a CORBA Object Transaction Service (OTS) or a Java Transaction API (JTA) compliant system.

14. A container-based distributed computer system as recited in claim 12, wherein the container-based distributed computer system is a Java 2 Platform Enterprise Edition (J2EE) compliant system.

15. A container-based distributed computer system as recited in claim 12, wherein an "after_completion" operation is used to invoke the operation immediately following the completion of the transaction.

* * * * *